Patented June 19, 1945

2,378,824

UNITED STATES PATENT OFFICE 2,378,824

PROCESS FOR RECOVERING SELENIUM

Jesse O. Betterton, Santa Ana, Calif., and Yurii E. Lebedeff, Metuchen, N. J., assignors to American Smelting and Refining Company, New York, N. Y., a corporation of New Jersey No Drawing. Application June 27, 1942, Serial No. 448,840

4 Claims. (Cl. 23—209)

This invention relates to the recover of selenium and more particularly to a process of treating selenium-bearing substances to convert the selenium to a water-soluble form.

Heretofore, in the treatment of metallurgical slimes and the like to recover selenium, it has been the practice to add an appropriate amount of niter to the slimes after which it is fused to a molten mass in order to oxidize the selenium and convert it to a water-soluble compound. Such a process is described in Letters Patent to Frank F. Poland, No. 2,048,563, dated July 21, 1936. This patent discloses a satisfactory way of treating metallurgical slimes to recover selenium, but due to the high temperatures employed to effect fusion of the mixture, special equipment is required to prevent appreciable losses of selenium by volatilization.

After considerable experimentation we have found that substantially the same results can be obtained with respect to selenium by merely subjecting an aqueous slurry or paste-like mixture of slime and alkali metal reagent to a low temperature bake without fusing the mass. In accordance with this invention, the employment of high temperatures and fusion of the mass is avoided with its attendant disadvantages.

In order that the invention may be readily understood the following specific examples are given as exemplary of our preferred procedure:

Example I

Three hundred grams of leached copper refinery slimes, free from water and analyzing 7.25% selenium was mixed with 150 grams of sodium nitrate. After mixing the ingredients, water was added in sufficient amount to form a uniform thick paste. This paste-like mass was heated in a cast iron kettle for 2½ hours at 800° to 850° F. Upon removal of the baked mass it was found that 96.2% of the original selenium content had been converted into a water-soluble constituent.

Example II

In this case 300 grams of leached copper refinery slimes containing 7.25% selenium was mixed with 150 grams of sodium carbonate ($Na_2CO_3$) and the mixture heated for three hours at 850° F. Conversion of approx. 96.4% of the selenium to water-soluble form was obtained.

Example III

In this instance the process was carried out as in Example I, except that sodium chloride was substituted for one-half of the niter requirement. No appreciable lowering in the conversion of selenium to water-soluble form was noted, and the substitution of salt for a portion of the niter resulted in effecting a substantial saving in baking reagents. Further it eliminated the cost of salt required to be added subsequently to precipitate the selenium from the leach solution.

The recovery of selenium from the water solution of sodium selenate was accomplished by precipitation with $SO_2$ gas in the presence of about 30% by volume of $H_2SO_4$ and 4 parts NaCl for each part of selenium in solution. By adding salt as a baking reagent no additional salt was required to obtain complete precipitation of the selenium from the leach solution. The purity of the selenium obtained using niter-salt baking reagents was found to be somewhat less than when niter or soda ash were used alone.

A number of advantages accrue from the use of our baking process treatment as compared with prior fusion methods. Some of the more important advantages may be listed as follows:

(a) Loss of selenium by volatilization is practically negligible.

(b) A minimum amount of reagents can be used and no flux forming substances are required.

(c) Low cost equipment can be utilized since it is not required to withstand the highly corrosive action of molten reagents.

While certain novel features of the invention have been disclosed and are pointed out in the annexed claims, it will be understood that various omissions, substitutions and changes may be made by those skilled in the art without departing from the spirit of the invention.

What is claimed is:

1. In the process of treating selenium-bearing slimes to convert the selenium into a water-soluble form the procedure which comprises admixing with said selenium-bearing material, alkali metal salt material and water to form a thick slurry or paste, and thereafter heating the resultant mixture at a temperature sufficient to drive off the water and yield a baked but unfused mass, said treatment being continued for a period of time sufficient to bring about conversion of substantially all of the selenium into a water-soluble form.

2. The process according to the preceding claim in which the alkali metal salt material is selected from the group consisting of sodium nitrate, sodium carbonate, sodium chloride and mixtures thereof.

3. The process of treating selenium bearing slimes to recover selenium which comprises forming an aqueous slurry of said slime with sodium alkali reagent selected from the group consisting of sodium nitrate, sodium carbonate and sodium chloride and mixtures thereof added in an amount sufficient to react with the selenium present in the slime to convert the selenium to water-soluble form, subjecting the slurry mass to a temperature of from 800–850° F. for from 2 to 3 hours to form a baked, unfused mass in which the selenium has been substantially converted into a water soluble constituent without appreciable loss of selenium by volatilization, thereafter leaching said baked mass with water to dissolve out the water soluble selenium constituent, and precipitating the selenium from the leach solution to recover said selenium.

4. The process of treating selenium bearing slimes to recover selenium which comprises mixing slimes and an alkali mixture in the approximate proportion of 300 parts by weight of selenium bearing slime material to 150 parts by weight of alkali mixture composed of approximately 75 parts by weight sodium nitrate and 75 parts by weight sodium chloride, adding water to the mixture of slime and alkali reagents so as to form a thick slurry mass, heating said mass for about 2½ hours at a temperature between 800 and 850° F. to drive off the water and produce a baked mass, thereby converting the selenium present into a water soluble constituent without fusing the mass whereby loss of selenium by volatilization is avoided, thereafter leaching the water soluble selenium constituent formed with water, and then precipitating the selenium from the leaching solution by the addition of sulphuric acid and sulphur dioxide gas.

JESSE O. BETTERTON.
YURII E. LEBEDEFF.